(12) United States Patent
Nettleton et al.

(10) Patent No.: US 6,373,865 B1
(45) Date of Patent: Apr. 16, 2002

(54) PSEUDO-MONOLITHIC LASER WITH AN INTRACAVITY OPTICAL PARAMETRIC OSCILLATOR

(76) Inventors: John E. Nettleton, 8106 Oak Hollow Ct., Fairfax Station, VA (US) 22039; Bradley W. Schilling, 70 King Henry Ct., Fredericksburg, VA (US) 22406; Dallas N. Barr, 11974 William and Mary Cir., Woodbridge, VA (US) 22192

( * ) Notice: Subject to any disclaimer, the term of this patent is extended or adjusted under 35 U.S.C. 154(b) by 0 days.

(21) Appl. No.: 09/496,281

(22) Filed: Feb. 1, 2000

(51) Int. Cl.[7] .............................. H01S 3/11; H01S 3/10; H01S 3/08
(52) U.S. Cl. .......................... 372/10; 372/22; 372/27; 372/106
(58) Field of Search .............................. 372/10, 22, 27, 372/97, 98, 106, 107, 101, 108, 109

(56) References Cited

U.S. PATENT DOCUMENTS

| | | | | |
|---|---|---|---|---|
| 4,731,795 A | * | 3/1988 | Clark et al. | 372/107 |
| 5,854,802 A | * | 12/1998 | Jin et al. | 372/22 |
| 5,991,012 A | * | 11/1999 | Chen et al. | 356/5.01 |

* cited by examiner

*Primary Examiner*—Frank G. Font
*Assistant Examiner*—Armando Rodriguez
(74) *Attorney, Agent, or Firm*—Milton W. Lee; John E. Holford

(57) ABSTRACT

A subassembly for a high powered light pumped, Q-switched and linearly polarized laser with an optical parametric oscillator, the subassembly consisting of two or three rod shaped elements having precisely ground endfaces with selected coatings mounted on a special pallet that at least partially aligns the optical axes of the elements.

26 Claims, 3 Drawing Sheets

PSEUDO-MONOLITHIC LASER WITH AN INTRACAVITY OPTICAL PARAMETRIC OSCILLATOR

BACKGROUND OF THE INVENTION

1. Field of the Invention

The present invention generally relates to light pumped lasers, q-switched lasers, nonlinear optical elements, optical frequency conversion by nonlinear processes and microlasers. More particularly it relates to lasers in the near infrared spectrum extensively used for invisible sensing and range finding.

2. Description of Prior Art

Until now, a device with the same functionality as this invention would consist of many discrete optical components, each with associated optical mounts. Traditionally, these devices require constant precise mechanical alignment for optimized resonator functionality. The need for increasingly smaller laser devices has only exacerbated the many fabrication problems of these devices.

SUMMARY OF THE INVENTION

A very sophisticated small optically pumped laser subassembly is provided that consists of a minimum number of specially shaped and coated precision parts that are easily assembled and permanently adjusted in a very short time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
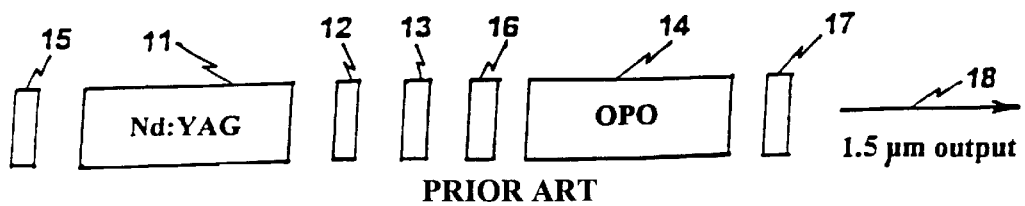
FIG. 1 is a side view of a prior art of a laser subassembly lacking only its optical pump.

FIG. 1 shows a laser subassembly, which lacks only an optical pump. Although any number of designs exist for an optically pumped, passively Q-switched, 1.5 micron wavelength, laser; the typical model 10 shown using an optical parametric oscillator (OPO) for frequency shifting has been chosen for improvement. The subassembly contains many discrete optical elements i.e. a laser rod of gain material 11, a polarizing element 12, a passive Q-switch 13, a body or rod of nonlinear dielectric material 14 for the OPO and three mirrors or reflecting filters 15, 16 and 17. All of these elements normally share a straight common optical axis 18. Moving from left to right along this axis, the first mirror 15 is called an HR mirror, because it is highly reflective at the pump-laser wavelength, in this case 1.06 microns. The next element, the gain material 11, may be a rod shaped body of a specific solid state laser crystal, such as the material Neodymium:Yttrium-Aluminum-Garnet (Nd:YAG). These crystals lapse at characteristic light wavelengths when light pumped and are transparent/clear to the wavelength of the pump light. Following the laser rod is the linear polarizing element 12, for instance a thin "polaroid" filter, a polarizing crystal or reflective polarizing structure such as a grid of fine wires. The polarizer is included in the subassembly to support applications that require a single polarization. Next the passive Q-switch 13 can be an axially thin sheet of dye-impregnated plastic, or other material. For this invention a thin Q-switch of Cr(4+):YAG material is preferred, based on its longevity and thermal match to Nd:YAG. The optical parametric oscillator or OPO is made up of the reflecting filter 16, a nonlinear crystal rod 14; and the output coupling mirror 17. The filter-mirror 16 may consist of fractional wavelength Langmuir-Blodgett layers that become an antireflection (AR) optical filter at the pump wavelength and a high-reflection (HR) optical mirror at the 1.5 micron output wavelength. The output coupling filter-mirror has a high reflectivity at the pump wavelength, but provides at least partial transmission at the OPO or output wavelength. To prevent refraction at the spaced opposed surfaces of the above laser elements these surfaces are usually ground and polished normal to the common optical axis. The disadvantage of this standard laser design lies in the number of individual optical elements, which adds complexity, cost, and the need for precise mechanical alignment.

Figure 2:
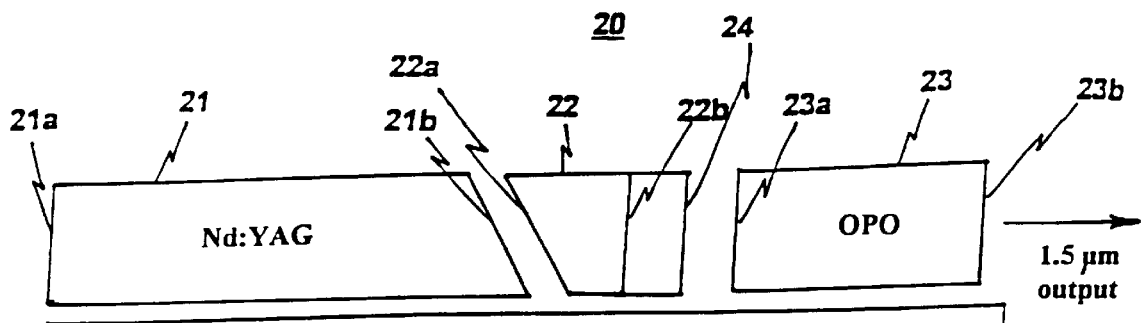
FIG. 2 is an exploded side view of applicant's improved laser subassembly wherein key components have at least one flat end normal to the optical axis of the laser.

FIG. 2 shows a first embodiment of a laser subassembly 20 as outlined above according to the present invention. The laser material may supplied in two components 21 and 22 to permit polarized lasing without a separate polarizer. The first input and final output faces 21A and 22B of the laser and similar faces 23A and 23B of the nonlinear material 23 are cut very precisely and exactly parallel to a high tolerance. If a separate sheet type polarizer is used, it must be manufactured to uniform thickness and attached to the output face 22B. It is preferred, however, to make the laser operate in a linear polarized mode without a separate polarizer. To achieve this a Brewster angle (ø=arctan n) tilt from the optical axis can be applied to one or more endfaces 22A and/or 21B of the gain material, n being the index of refraction of the material. One problem with having a single Brewster-cut optic face replace a normal face in the laser is that the light beam is refracted away from the linear optical axis in accordance with Snell's law. This can result in a laser with an optical axis that takes an abrupt turn, basically an undesirable attribute, especially for micro-laser systems. Applicants avoid this by slicing a uniform slit at the Brewster angle to the optical axis through the laser rod, thus producing the two polarizing rod elements 21 and 22 from a single rod of gain material. The longer element is used for a main laser rod 21 and the shorter rod element 22, when placed in its same angular position relative to the main rod and optical axis, becomes a secondary polarizer element or endcap used to refract the optical axis back in line. To minimize displacement of the axis, the axial length of this slit may be decreased by moving the endcap as close to the main laser rod as possible without touching. Of course, the rod and end cap can be made entirely separately from materials with similar characteristics, if desired. Although this polarizing structure normally removes only about 15% of the undesired polarization, the repeated reflections that occur in both directions during the lasing process remove nearly 100% of the undesired polarization. The remaining normal endface 21A of the laser rod, after polishing, is coated with a mirror material 24, e.g. silver or aluminum, that functions as the HR mirror. The remaining normal endface 22B of the endcap or the exposed face of the sheet polarizer, if used, is bonded to an axially thin uniform thickness layer of material that acts as a Q-switch to produce short intense bursts of radiation from a low average pump radiation source. A Cr(4+):YAG q-switch, for example, with very flat parallel faces may be bonded to the normal output face, either by a process such as diffusion bonding or with epoxy. If epoxy is used, the q-switch must be bonded with a matching material layer that passes the lasing frequency without significant reflection, i.e. the bonding layer forms a matching transformer. The first four elements from FIG. 1 thus have now been reduced to one or two components. The OPO material is prepared in the same manner as the gain material to have substantially the same cross-section and providing normal endfaces 23a and 23b. The filter mirrors 15, 16 and 17, from FIG. 1 are formed on the normal faces 21a, 23a and 23b, respectively, by standard deposition and/or bonding techniques, as indicated above. All of the elements thus have the same cross-section and the last three elements are reduced to a single component bringing the component total to two or three. A fourth component 25 that forms an optical platform or pallet will be discussed more specifically at FIGS. 4–6.

Figure 3:
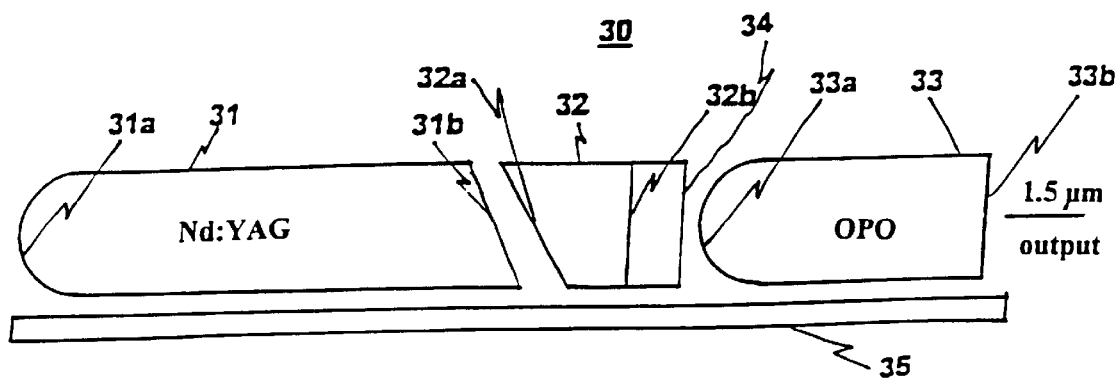
FIG. 3 is also an exploded side view of applicant's laser subassembly wherein key components have at least one spherical end, its great generating sphere being centered on an extension to the optical axis of the laser.

FIG. 3 shows a slightly different embodiment of the invention. Instead of the normal input end faces on the main rod and OPO components above at least some of these faces like 31a and 33a are spherical. The curvature of these faces is exaggerated for emphasis in the drawing. The Brewster faces 31b and 32a, however, must remain flat. Faces 32b and 33b can also be spherical if desired. Each face is generated by a radius many times longer than the optical axis subtended by all of the components and centered on the optical axis extended. All of the normal output endfaces can be similarly curved, to provide extremely stable operation, if desired. Mirrors, filters Q-switches and sheet polarizers attached to such surfaces will take on these same spherical characteristics. This slight curvature concentrates the beam near the optical axis, for more efficient lasing and can also be used to control the spread of the beam after it leaves the laser. Along with a flat endfaces, these convex endfaces form a family whose members approach a flat surface as their radius approaches infinity. The output mirror 17 can also have a radially varying reflection at the third wavelength to control the shape of the output beam by means of the pattern of leakage it permits. As before these components are mounted on a pallet 35.

Figure 4:
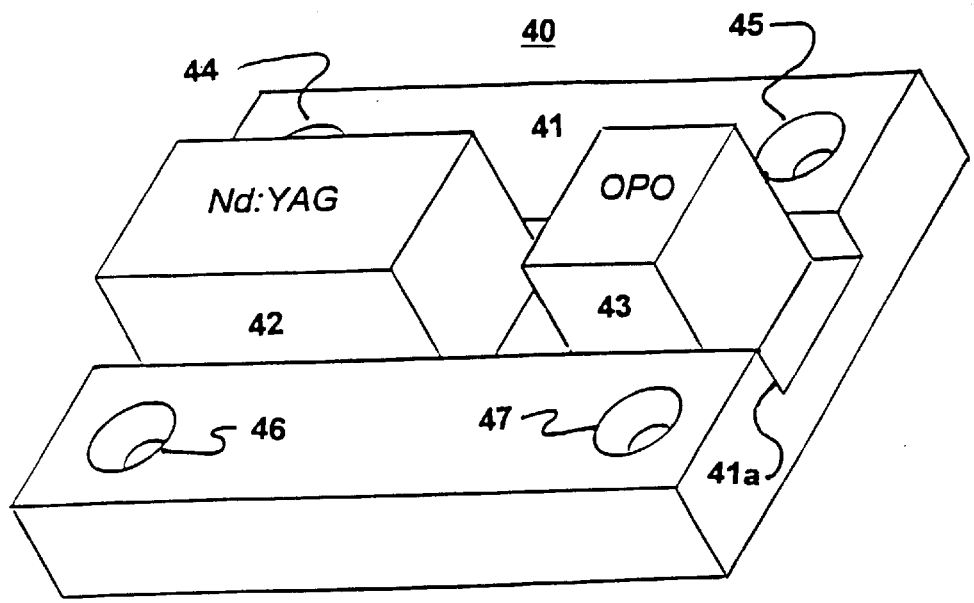
FIG. 4 is an isometric view of the laser subassembly shown FIG. 2 or 3, which includes an alignment groove in its optical platform for laser rods with square or rectangular cross-sections.

FIG. 4 shows a subassembly 40 with a platform or pallet 41 carrying two components a laser rod 42 and an OPO rod 43, in accordance with the above teachings. The third component in a Brewster arrangement would of course have same cross-section and be placed between these two. The pallet shown in FIGS. 2 and 3, but not FIG. 1, consists of a Nd:YAG, ceramic, silicon, or some other material. Normally this component would normally include a bench and supports, some adjustable, for each element shown in that figure. Applicants replace all of these elements with a single thin pallet component 41 having one dimension long enough to engage a substantial surface portion on each of the remaining components. Preferably this palette engages a surface portion at least equal to axial length times the width of each component. The pallet material must be thermally matched to the gain material and the nonlinear material, so that the remaining two or three components can be successfully bonded to it. The bonding surface of the pallet may be completely flat, in which case a jig must be provided to space the components and align their optical axes during the bonding procedure. However, it is preferred that the pallet define an alignment groove 41a with a uniform cross-section parallel to the above one dimension to automatically align the components axes. For simplicity and stability, it is preferred that the cross-section of the components be square or rectangular and that the cross-section of the groove be rectangular with a width, preferably greater than its depth, that matches the width of the components. Standard adhesives, e.g. epoxies, placed in the groove first just lubricate the components while they are being adjusted and later solidify to hold them in place.

The components may be exposed to pump radiation during the spacing adjustment to obtain maximum output or may merely be separated with extremely accurate spacer tools. If the components are made with sufficient precision the same spacing tools can be used for similar components, or they could be customized for each laser. Automatic powered spacing tools can be used to move the components along the groove, while they are being pumped until a maximum output is detected, stopping the tool. Making the components so that they can merely be pressed into contact, after being placed in he groove is not impossible, but presents problems when Brewster polarizers and layered filters are involved. The pallet may also include features for supporting it relative to the light pump and the system that includes them. The size and shape of the platform beyond the groove is a matter of choice depending on the application for which the laser is designed. The edges can be contoured to fit a frame or clamps and/or provided with screw holes, like holes 44–47, if required.

Figure 5:
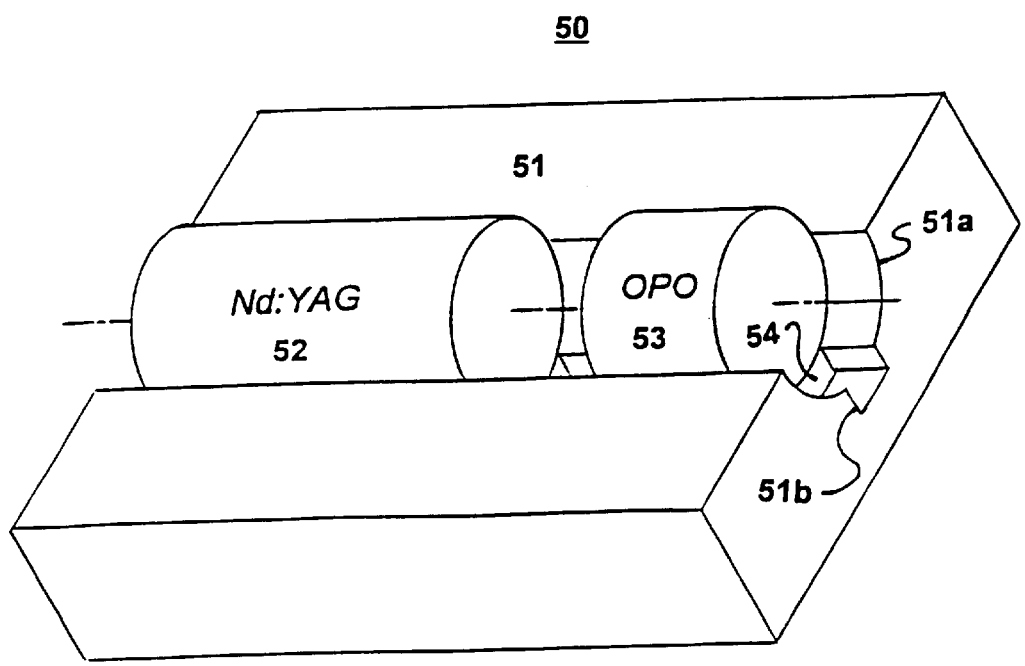
FIG. 5 is an isometric view of the laser subassembly shown FIG. 2 or 3, which includes an alignment groove in its optical platform for laser rods with circular or regular polygonal cross-sections.

As shown in FIG. 5, a subassembly 50 having components with round cross-sections, like laser rod 52 and OPO 53 can be used with a palette 51 defining a matching groove 51a of curved cross-section by taking care to properly orient any polarization sensitive components. An additional smaller groove 51b in the pallet and a matching material projection 54 bonded to the polarization sensitive components could be provided to ensure this orientation. This alignment scheme also works reasonably well with rods of polygonal cross-section with a matching groove. Round and polygonal rods have maximum stability when the depth of the groove places the optical axis at or below the surface of the pallet. Polygonal rods with mating grooves can maintain polarization features without the additional groove and projection, described above.

Figure 6:
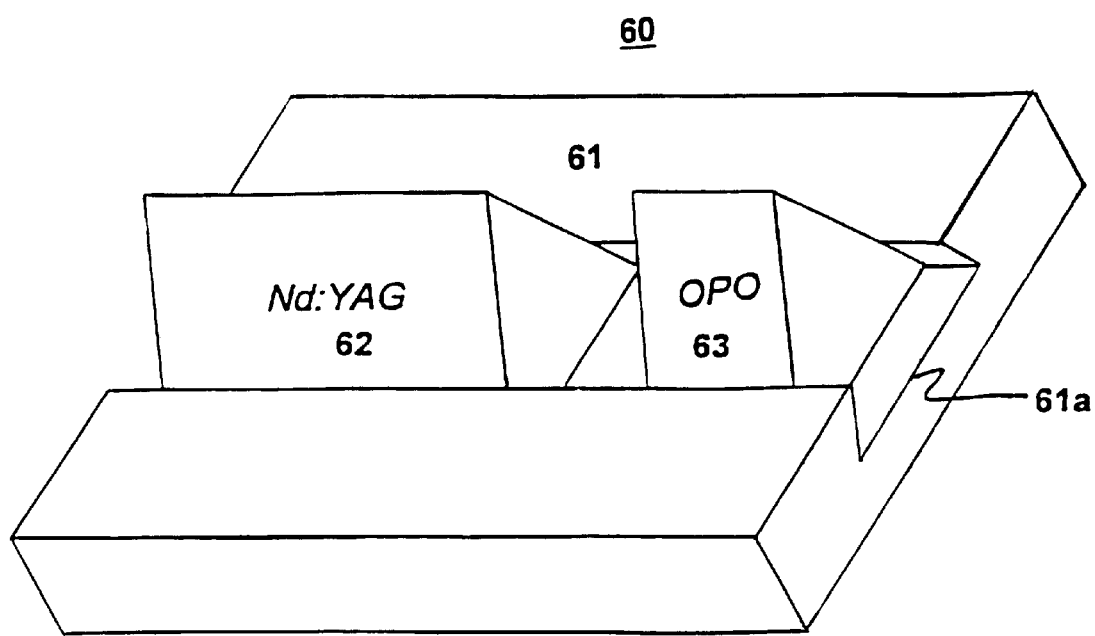
FIG. 6 is an isometric view of the laser subassembly shown FIG. 2 or 3, which includes a dove-tail alignment groove in its optical platform for laser rods with triangular or trapezoidal cross-sections.

As shown in FIG. 6, the components and groove can be also be dove-tailed, if desired, so that adjustments may be made with the pallet or platform rotated to any position around the optical axis. For simplicity the rod components are shown with a triangular cross-section, although it is obvious that trapezoidal and other cross-sections will dove-tail similarly. Triangular rods can also be accommodated by V-shaped grooves without the dove-tail feature.

The pseudo-monolithic design applies to gain materials and laser resonator designs other than those shown here. For instance, Nd:YVO4 is a material that applicants considered as an alternate to Nd:YAG for the laser rod. Nd:YVO4 has the advantage of producing polarized output without the need for a separate polarizing element or Brewster cut optic, potentially reducing the parts count in this monolithic design even farther. However, applicants preferred not to use Nd:YVO4 in their experiments due to several negative factors, namely that it is more expensive than Nd:YAG, it is softer and therefore harder to machine, and it has a thermal mismatch to the Cr(4+):YAG passive q-switch.

While this invention has been described in terms of a preferred embodiment consisting of square rods of specific materials, those skilled in the art will recognize that the invention can be practiced with modification within the spirit and scope of the

Having thus described my invention, what I claim as new and desire to secure by Letters Patent is as follows:

1. A light pumped laser and optical parametric oscillator subassembly including all optical elements, except for said pump, grouped into components with equal uniform cross-sections, aligned on a common optical axis between first and second spaced points thereon and secured to a pallet; said elements each having opposed endfaces centrally intersected by said axis and chosen from a group comprising axially normal flat endfaces, axially sloping flat endfaces and slightly curved convex endfaces defined by spheres centered on said axis with diameters many times the spacing between said points; said elements including:

a first rod of a linear material that lases at a second wavelength when exposed to pump photons of a first wavelength, said first rod having a first optical axis, at least a first sideface a given distance from and parallel to said first axis, first and second endfaces with said first endface at said first point and coated with a mirror that reflects substantially all light impinging thereon;

a second rod of said linear material said second rod having a second optical axis, at least a second sideface at said given distance from and parallel to said second axis with third and fourth endfaces, at least said fourth end face being normal to said second axis;

a light polarizing means mounted between said second and third endfaces, which linearly polarizes radiation at said second wavelength:

a final rod of a nonlinear material that converts said lased light to output light of a third wavelength, said final rod having a final optical axis, at least one final sideface at said given distance from and parallel to said final axis and penultimate and ultimate endfaces normal to said final axis, with said ultimate endface at said second point;

a filter coated on said penultimate endface that reflects substantially all light of said third wavelength while passing substantially all light of said second wavelength impinging thereon, said ultimate endface being coated with a mirror that reflects substantially all of the light of said second wavelength while passing a portion of the light of said third wavelength impinging thereon;

a wafer shaped Q-switch bonded normal to said second axis between said fourth endface and said filter; and said pallet having a flat bottom surface and a broad upper surface that mates with and bonds to said first, second and final sidefaces, said upper surface being positioned to confine the optical axes of said rods and said common optical axis in a common plane parallel to said bottom surface, while all of said axes are being aligned.

2. A subassembly according to claim 1; wherein: said linear material consists of Nd:YAG.

3. A subassembly according to claim 1; wherein:

said side surfaces and said broad surface are shaped and positioned to confine said rods such that their optical axes and said common optical axis define a single axis parallel to said bottom surface.

4. A subassembly according to claim 1; wherein:

said polarizing means is a thin flat filter with broad parallel endfaces centered normally on said common optical axis bonded between said second and third endfaces to pass only one linear component of polarized light at said second wavelength between said second endface and said penultimate endface.

5. A subassembly according to claim 1; wherein;

said Q-switch consists of CR(4+):YAG.

6. A subassembly according to claim 4; wherein:

said Q-switch consists of CR(4+):YAG.

7. A subassembly according to claim 1; wherein:

said pallet defines a groove in said upper surface having a uniform cross-section that matches a common portion in the cross-section for all of said rods; said groove being coated with a slow setting adhesive lubricant; and said rods being aligned firmly but slideably in said groove to a preselected spacing before said lubricant sets.

8. A subassembly according to claim 1; wherein:

said rods have square cross-sections.

9. A subassembly according to claim 1; wherein:

said rods have rectangular cross-sections.

10. A subassembly according to claim 1; wherein: said rods have round cross-sections.

11. A subassembly according to claim 1; wherein: said rods have triangular cross-sections.

12. A subassembly according to claim 1; wherein: said rods have trapezoidal cross-sections.

13. A subassembly according to claim 1; wherein:

said rods have polygonal cross-sections with more than four sides.

14. A subassembly according to claim 1; wherein:

said substantially flat end faces are portions of a very large spheres centered on said optical axis.

15. A subassembly according to claim 1; wherein:

at least said first and penultimate end faces are curved.

16. A light pumped laser and optical parametric oscillator subassembly including all optical elements, except for said pump, grouped into components with equal uniform cross-sections, aligned on a common optical axis between first and second points thereon and secured to a pallet; said elements each having opposed endfaces chosen from a group comprising normal flat endfaces, sloping flat endfaces and slightly curved convex endfaces defined by spheres with radii many times the spacing between said points centered on said axis, said components including:

a first rod of a linear material that lases at a second wavelength when exposed to pump photons of a first wavelength, said first rod having a first curved endface, a second flat endface tilted by Brewster's angle to said common axis with said first endface at said first point, said first endface being coated with a mirror that reflects substantially all light impinging thereon;

a second rod of said linear material having third and fourth flat endfaces with said fourth endface at said second point, said third endface being slightly spaced from and tilted parallel to said second, and said fourth endface being normal to said common axis, a final rod of a nonlinear material that converts said lased light to output light of a third wavelength, said final rod having a penultimate flat endface and an ultimate endface with said ultimate endface at said second point, said penultimate endface being coated with a filter that reflects substantially all light of said third wavelength while passing all light of said second wavelength impinging thereon and said ultimate endface being coated with a mirror that reflects all of the light of said second wavelength while passing at least a portion of said third wavelength light impinging thereon; and said pallet having a flat bottom surface and an upper surface parallel to said bottom surface, said upper surface mating with said side surfaces on said rods and bonded thereto after the axes of said rods are aligned.

17. A subassembly according to claim 16; wherein:

said fourth endface is covered by a wafer of Q-switch material with normal flat parallel endfaces and sufficient thickness and light absorbing properties to delay resonance until a maximum population inversion occurs in said first rod;

Q-switch bonded between said polarizer and said penultimate endface to concentrate said polarized lased light into high energy pulses.

18. A subassembly according to claim 17; wherein: said rods have square cross-sections.

19. A subassembly according to claim 17; wherein: said rods have rectangular cross-sections.

20. A subassembly according to claim 4; wherein: said rods have round cross-sections.

21. A subassembly according to claim 4; wherein: said rods have triangular cross-sections.

22. A subassembly according to claim 4; wherein: said rods have trapezoidal cross-sections.

23. A subassembly according to claim 4; wherein: said rods have polygonal cross-sections with more than four sides.

24. A subassembly according to claim 16, wherein said upper surface is flat and said sidefaces are flat whereby mating said surfaces aligns the optical axes of said rods and said common axis in a single plane parallel to said base.

25. A subassembly according to claim 16; wherein:

said upper surface and said side surfaces are shaped and to mate and align the optical axes of said rods and said common axis in a single axis.

26. A subassembly according to claim 1; wherein: said polarizer consists of said second and third endfaces sloped to said second and third axes at Brewster's angle, respectively, and spaced parallel to one another.

* * * * *